United States Patent
Haibara et al.

(10) Patent No.: US 7,276,168 B2
(45) Date of Patent: Oct. 2, 2007

(54) METHOD FOR SUPPLY OF CONSTANT-CONCENTRATION OZONATED WATER

(75) Inventors: Teruo Haibara, Yamaguchi (JP); Kenichi Uemura, Yamaguchi (JP); Takio Adachi, Saitama (JP); Youichi Shimoi, Kanagawa (JP)

(73) Assignee: Siltronic AG, Munich (DE)

( * ) Notice: Subject to any disclaimer, the term of this patent is extended or adjusted under 35 U.S.C. 154(b) by 373 days.

(21) Appl. No.: 10/975,510

(22) Filed: Oct. 28, 2004

(65) Prior Publication Data

US 2005/0115909 A1    Jun. 2, 2005

(30) Foreign Application Priority Data

Nov. 28, 2003    (JP) .............. 2003-436042

(51) Int. Cl.
C02F 1/78    (2006.01)
(52) U.S. Cl. ............... 210/739; 210/760; 210/765
(58) Field of Classification Search ............... 210/739, 210/746, 760, 900, 765; 422/29
See application file for complete search history.

(56) References Cited

U.S. PATENT DOCUMENTS

| | | | |
|---|---|---|---|
| 6,153,151 A | | 11/2000 | Moxley et al. |
| 6,186,170 B1 * | | 2/2001 | Koganezawa et al. ...... 137/563 |
| 6,409,918 B1 * | | 6/2002 | Morita et al. ............... 210/192 |
| 6,585,898 B1 * | | 7/2003 | Ekberg et al. .............. 210/760 |
| 2003/0042631 A1 | | 3/2003 | Nelson et al. |
| 2003/0164338 A1 | | 9/2003 | Fittkau et al. |

FOREIGN PATENT DOCUMENTS

| EP | 0970916 A | 1/2000 |
|---|---|---|
| JP | 2000167366 A * | 6/2000 |

OTHER PUBLICATIONS

Japanese Patent Abstract JP-A-07-277705 Oct. 1995.
Japanese Patent Abstract JP 2000-005285 Jan. 2000.
Japanese Patent Abstract JP-A-2000-167366 Jun. 2000.
Patent Abstracts of Japan, 10287404, Oct. 1998.

* cited by examiner

*Primary Examiner*—Matthew O. Savage
(74) *Attorney, Agent, or Firm*—Brooks Kushman P.C.

(57) ABSTRACT

A method for the supply of a constant-concentration ozonated water, employs a unit for producing ozonated water and a system for using the ozonated water at a place separated therefrom, interposing an ozonated water circulating line between the ozonated water producing unit and the place for using the ozonated water, causing the interior of the circulating line to circulate the ozonated water so that the flow rate may be constantly fixed at the outlet of the ozonated water producing unit, monitoring the ozone concentration of the ozonated water in the neighborhood of the outlet, adjusting the amount of an ozone gas supplied to the ozonated water producing unit based on the results of the monitoring, further monitoring the amount of the ozonated water used at the place for using the ozonated water, and controlling the amount of the ozonated water to be produced based on the results of this monitoring.

14 Claims, 2 Drawing Sheets

METHOD FOR SUPPLY OF CONSTANT-CONCENTRATION OZONATED WATER

CROSS REFERENCE TO RELATED APPLICATIONS

Applicants claims priority under 35 U.S.C. §119 of Japanese Application No. 2003-436042 filed Nov. 28, 2003.

BACKGROUND OF THE INVENTION

1. Field of the Invention

The present invention, in the use of the ozonated water for such purposes as cleaning and giving a surface treatment, concerns a method for supplying the ozonated water with the ozone concentration maintained constant even when the amount of the ozonated water to be used at the place of use is varied. To be specific, the present invention is used in producing and supplying the ozonated water by following the fluctuations in the amount of the ozonated water to be used at the place of use. Examples of this use are when the ozonated water is utilized for such operations in the process for the production of semiconductors as treating substrates by peeling a resist from a substrate or cleaning the substrate after removal of the resist and such operations as giving a surface treatment, cleaning, and sterilizing ordinary resins and metals.

More specifically, the present invention concerns a method for the supply of an ozonated water which can be applied in the treatment of semiconductor substrates and liquid crystal substrates to the removal of resist scraps and organic stains, the removal of defiling metals and extraneous substances, and the removal of organic and inorganic dirt and extraneous substances from the masking materials made of quartz plate and used in the production of semiconductors and liquid crystals. In the ozone treatment of resins and metals, the method of this invention is available for treating by surface oxidation, cleaning, and sterilizing resins and for removing organic substances from the surfaces of metals and treating the metals by oxidation, for example.

2. The Prior Art

By reason of the low load exerted by the strong oxidizing power of the ozonated water and the self-decomposing property of the ozone on the environment, the utilization of the ozonated water has been promoted in various fields. The treatment using the ozonated water is effected by various methods such as directly introducing the ozonated water supplied from the ozonated water producing unit into the treating column holding an article under treatment or causing the ozonated water to flow directly onto an article under treatment. Particularly, in the treatment which utilizes the strong oxidizing power of the ozonated water, the temperature, treating time, concentration of the ozonated water, flow rate of the ozonated water, and method of the treatment form important factors for the sake of acquiring a fixed quality of treatment. While the temperature and the treating time are capable of accomplishing prescribed conditions by the control in the treating unit, the concentration of the ozonated water and the flow rate of the ozonated water depend on the capacity of the ozonated water producing unit.

The ozone in water manifests a high self-decomposing property. Particularly, when it has a high concentration exceeding 10 ppm, this concentration is conspicuously decreased by the unit. When semiconductors and resins are treated by using the ozonated water, the concentration of the ozonated water must be maintained constant for the sake of stably obtaining products surpassing a fixed level.

Thus, even when the ozonated water is used intermittently at the place of use, it has been customary for the purpose of maintaining the concentration of the ozonated water constant not to suspend the ozonated water. This occurs even during the time interval having no use for the ozonated water but to allow the ozonated water to flow past the place of use into the waste bin. Recently, as the utilization of the ozonated water has gained in impetus, in the place of the conventional practice of having ozonated water producing units disposed severally at different places of use, the feasibility of a system having a large ozonated water producing unit disposed at the center and forwarding the produced ozonated water to different places of use separated by distances from the producing unit has been tried.

In the circumstance, an attempt simply to forward the ozonated water or circulate it randomly results in excess use of the ozone and the feed water and excess design of ozonated water production facilities. These adverse effects are aggravated in accordance as the concentration of the ozonated water to be used increases.

Patent Document 1 discloses a method which aims to maintain the concentration across a long distance without using an ozone concentration meter by forming a circuit system and estimating the amount of decomposition of ozone during the conveyance over the distance based on the rate of ozone decomposition. Patent Document 2 discloses an ozonated water supply device which takes account of the attenuation of the concentration over the distance similarly in the circulation system and has a mention of occasionally using the ozonated water of high concentration as diluted at the place of use.

[Patent Document 1] Official Gazette of JP-A-0 7-277705 (page 2 and FIG. 1)

[Patent Document 2] Official Gazette of Patent No. JP3321557 (pages 1-3)

Since these prior techniques cover the concentrations of ozonated water in a range not exceeding about 20 ppm at most and since the degrees of purity of the water used thereby do not seem to assume the purity of the level of the ultra pure water used currently in semiconductors, it is inferred that the attenuation of the ozone is not so large. Also the emulation of a certain degree is attainable without requiring particularly rigid control even when the ozonated water is used intermittently. That is, the circulation of the ozonated water for the sake of recovery of the ozonated water is an effective measure where the attenuation of the concentration of the ozonated water due to the elapse of time is small. When the rate of attenuation is large as in the case of the ozone in the ultra pure water, the attenuation of the ozone in the return flow of the circulation is largely affected by the fluctuation of the amount of the ozonated water used at the place of use. By the mere circulation, therefore, it has been difficult to comprehend the amount of the ozonated water used and the concentration of ozone in the return flow and it has been difficult to attain constant supply of the ozonated water of the constant concentration.

When the amount of the ozonated water to be used at the place of use is constant, the ozone concentration can be controlled so that it may remain constant at a remote place by using the method taught by Patent Document 1 or 2. Further, even in the intermittent use, it may be possible to repress the decrease of the ozone concentration in the return flow to a small amount. This is done by setting the flow rate of the circulation of the ozonated water at a sufficiently large magnitude as compared with the maximum magnitude of the amount of the ozonated water to be used.

In the manufacture of a plant unit, it is commendable on account of the necessity for cutting the cost to set the flow rate of the circulation of the ozonated water at a proper magnitude conforming to the maximum amount of use. Where the use at the place of use is intermittent, the ozone concentration in the return flow tends to fluctuate largely proportionately to the amount of use.

In forming a circulating line in an ordinary plant unit, the practice of installing a storage tank for the return flow, receiving the water supplied therein, and supplying the water to the target plant unit is often followed with a view to promoting the stabilization of the operation. For the control of the water supplied here, the method for fixing the liquid level in the storage tank is popularly adopted. When this method is intended to be adopted in the present system, the ozone gas to be supplied to the ozonated water production device necessitates simultaneous production and supply of the same amount of the ozone gas as the amount of the ozonated water used at the place of use, namely the amount of the ozone to be consumed. The cost of the ozone gas generating unit occupies a large proportion in the cost of the manufacture of the ozonated water producing unit. For the purpose of constructing the system economically as a whole, it is commendable to lower the cost of the ozone gas generating unit to the fullest possible extent and complete the unit in a small scale.

The supply of the constant-concentration ozonated water entails numerous factors as mentioned above. These factors may be ascribed to the fact that the ozonated water decomposes at a very high speed and the fact that the expense of the ozone gas generating unit assumes a large proportion of the expense of the entire system. Thus, the desirability of developing a method for effective supply of the ozonated water satisfying all these points of view has found a widespread recognition.

SUMMARY OF THE INVENTION

The inventors developed an apparatus for the production of ozonated water of high concentration by the system of a packed column which, as disclosed in the Official Gazette of JP-A-2000-167366, is provided in the upper part of the packed column with a water inlet port and an exhaust gas outlet port, in the lower part of the packed column with an ozone gas inlet port and an ozonated water discharge port, and in the interval thereof with two or more packed beds partitioned with a gas backflow preventing plate so as to establish counterflow contact of the water and the ozone gas. They produced an ozonated water of high concentration by this apparatus and continued a diligent study concerning the behavior of the ozone in the water and the utility of the ozonated water. They found that the ozone in the ozonated water decomposed at a high speed, the ozone concentration readily decreased when the ozonated water was left standing. Also for the purpose of supplying the constant-concentration ozonated water, it was necessary to avoid stopping the apparatus but continue the operation of the apparatus even when the use of the ozonated water was intermittent. They further found that the ozonated water produced during the time interval finding no use for the ozonated water, when simply stored, suffered decline of concentration and could not be easily utilized for a necessary ozonated water concentration.

In order to secure a stable effect in the treatment of the ozonated water, the apparatus is required to maintain a high ozonated water concentration and avoid being affected by the fluctuation of the amount of the ozonated water to be used. This apparatus is required to be materialized at the lowest possible cost. In view of this situation, this invention aims to solve the problems and achieve the results enumerated above.

In a first embodiment, the present invention concerns a method for the supply of a constant-concentration ozonated water, comprising employing a unit for producing ozonated water by contact between an ozone-containing gas and water and a system for using the ozonated water produced by the unit at a place separated therefrom, interposing an ozonated water circulating line between the ozonated water producing unit and the neighborhood of the place for using the ozonated water, causing the interior of the circulating line to circulate the ozonated water so that the flow rate may be constantly fixed at the outlet of the ozonated water producing unit, monitoring the ozone concentration of the ozonated water in the neighborhood of the outlet, adjusting the amount of an ozone gas supplied to the ozonated water producing unit and/or the concentration of the ozone gas based on the results of the monitoring, further monitoring the amount of the ozonated water used at the place for using the ozonated water, and controlling the amount of the ozonated water to be produced based on the results of this monitoring.

In a second embodiment, the present invention concerns a method for the supply of a constant-concentration ozonated water, comprising employing a unit for producing ozonated water by contact between an ozone-containing gas and water and a system for using the ozonated water produced by the unit at a place separated therefrom, disposing a storage tank in the ozonated water producing unit or between the ozonated water producing unit and the place for using the ozonated water, interposing an ozonated water circulating line between the ozonated water producing unit, the storage tank, and the neighborhood of the place for using the ozonated water, causing the interior of the circulating line to circulate the ozonated water so that the flow rate may be constantly fixed at the outlet of the ozonated water producing unit, monitoring the ozone concentration of the ozonated water in the neighborhood of the outlet, adjusting the amount of an ozone gas supplied to the ozonated water producing unit and/or the concentration of the ozone gas based on the results of the monitoring, and relaxing the change of the load exerted by the change in the amount of the ozonated water to be used to bear on the ozonated water producing part.

A method for the supply of constant-concentration ozonated water set forth in the second embodiment may control the amount of the ozonated water to be produced by monitoring in an ozonated water returning line the amount of the ozonated water used at the place for using the ozonated water.

An apparatus for the production of ozonated water to be used in this invention is preferred to produce the ozonated water by dissolving ozone gas in water, give rise to a concentration gradient of the ozonated water during the course of the production, and supply the ozonated water returned through the ozonated water returning line to the place allowing the presence of the concentration gradient of the ozonated water at or after the water supply point of the ozonated water producing unit.

Further, the ozonated water producing unit is preferred to utilize an absorption column.

In a method for the supply of constant-concentration ozonated water, the use of the ozonated water is preferred to be connected to semiconductors.

In a method of the present invention, the ozonated water produced and supplied by the ozonated water producing unit is preferred to have a concentration of not less than 10 ppm.

The inventors understood the properties of the ozonated water and pursued a diligent study thereon. They have consequently found that for the purpose of stably obtaining the ozonated water of high concentration, it is important that the ozonated water is supplied incessantly through the ozonated water supplying line and the ozonated water which has escaped being used is returned as much as possible to the ozonated water producing unit and put to use again. The ozonated water decomposes at a high speed. In order to supply the ozonated water at a constant concentration, it is necessary to monitor constantly the concentration of the ozonated water produced and supplied and subject the ozonated water producing unit to feedback control. Then, for the purpose of avoiding excess production of the ozonated water, it is important to monitor the amount of the ozonated water to be used at the place of use and effect necessary feedback control.

Generally, as means to transport a liquid, a method which forwards the liquid at a fixed flow rate and a method which forward the liquid with the pressure on the forwarding side controlled at a fixed magnitude are available. In the former case, the time for arrival at the place of use is fixed and the portion of the liquid which has not been used is either returned or discarded. In the latter case, the liquid can be used at the place of use always under a fixed pressure and the fluctuation in the amount of use does not result in an excess to be either discarded or recycled. The time required by the liquid departing from the forwarding side in reaching the place of use, however, is fated to vary depending on the amount of use.

In transporting such a liquid as the ozonated water which incurs fast decomposition of ozone and suffers the concentration thereof to vary with the time required for the transportation and enabling the place of use to acquire the ozonated water of a constant concentration, it is necessary to transport the ozonated water at a fixed flow rate and enable the time required for the arrival at the place of use to remain constant without reference to the amount of use.

When the amount of the ozonated water used at the place of use is intermittent or the amount of use fluctuates, the time for return from the place of use varies and the concentration of the ozonated water in the return flow fluctuates with the amount of use. As a result, the amount of the liquid and the concentration thereof in the return flow are fated to fluctuate.

Where the circulation flow path is provided therein with a pump adapted to form circulation of a liquid as in the apparatus of this invention, the influence of the fluctuation in the flow rate of the return flow is not easily transmitted to the outlet port of the ozonated water production unit. By the popular method which comprises monitoring the flow rate and the concentration at the ozonated water outlet and exerting necessary feedback on the ozone gas generating unit or the fresh water being supplied, the same control as is given to the ozonated water which has the flow rate and the concentration are constantly stabilized is not easily accomplished.

For the purpose of maintaining constant the ozone concentration at the place of use of the ozonated water despite the intermittent use, the sole control of the concentration and the flow rate at the outlet port of the ozonated water production unit is not sufficient and the feedback of the conditions of use at the place of use of the ozonated water to the ozonated water production unit is necessary.

The present invention, therefore, has developed a method which comprises monitoring the ozone concentration in the neighborhood of the outlet port of the ozonated water production unit and feeding back the result of this monitoring to the ozone gas generating device thereby adjusting the amount of the ozone gas supplied to the ozonated water production unit and/or the ozone gas concentration and meanwhile detecting the fluctuation in the amount of the ozonated water to be used from the amount of the ozonated water in the return flow and feeding back the result of this detection to the fresh water to be supplied thereby controlling the amount of the ozonated water to be produced and allowing the ozonated water of a constant concentration to be transported to a place separated from the ozonated water production unit and permitting cyclic use of the ozonated water.

Where the ozonated water is intermittently used at the place of use, the peak load exerted to bear on the ozonated water production unit can be relaxed by continuing the production of the ozonated water even during the absence of use of the ozonated water, storing the produced ozonated water, and releasing the stored ozonated water in time of need. Since the decomposition of ozone always continues in the storage tank owing to the self-decomposition of the ozonated water, the method of simply storing the produced ozonated water incurs difficulty in retaining the concentration of the ozonated water constant at all times.

The method which comprises disposing a storage tank between the production unit and the place of use and retaining the amount of the liquid transported and the concentration of the liquid constantly by fixing the amount of the liquid and the concentration thereof in the storage tank is practiced most popularly. When this method is adopted, however, the production unit is required to be capable of effecting the production by conforming to the load on the place of production to the maximum amount of use at the place of use. Even when the apparatus is such that the use at the place of use is intermittent and the maximum amount of use lasts only briefly, the production unit to be installed is required to be in a scale enough to withstand the load on the maximum amount of use.

In the case of the ozonated water production unit, the economic load on the ozone gas generating unit accounts for a large proportion in the expense of the entire system. The provision of the apparatus using the ozonated water intermittently with a unit of a capacity conforming to the load of the maximum amount of use results in necessitating an unusually large ozone gas generating unit. Thus, the use of an ozone gas generating unit which is adapted for the frequency of use or the amount of use turns out to be a method for economic use of the ozonated water.

By providing the storage tank of this nature with a mechanism which is capable of setting the storage tank at a proper minimum fitting the frequency and the amount of use of the ozonated water, constantly monitoring the ozone concentration, and adjusting the ozonated water concentration to be produced and compensating for the portion of the ozone to be lost by decomposition, it is made possible to supply the fresh feed water for the production of the ozonated water in an amount of time average of the amount of the ozonated water to be used and operate the apparatus without yielding any excess ozonated water and without particularly requiring to detect the amount of use except for the detection of the maximum and minimum amount of storage in the storage tank.

For the detection of the amount of the ozonated water to be used, the adoption of a method which determines the flow rates at the individual places of use may be conceivable. In the case of this invention, since the amount of the ozonated water to be circulated is larger than the total amount of the ozonated water to be used and the circulation of the ozonated water is continued at all times, it suffices to comprehend such data solely with respect to the return flow of the circulation. By monitoring this amount and feeding back the results of this detection properly, it is made possible to effect the production of the ozonated water in an amount conforming to the amount of use.

As means to produce the ozonated water, namely as devices for producing the ozonated water by the absorption of ozone gas in water, the ozonated water producing device disclosed in the Official Gazette of JP-A-2000-167366 and the ozonated water producing device mentioned above are examples of absorption column and the devices utilizing ordinary absorption columns, the devices utilizing ejectors, and the devices utilizing hollow fibers type membranes, and the devices for producing the ozonated water by utilizing the principle of electrolysis have been known. Any of these devices is usable for this invention.

Among other devices enumerated above, the ozonated water producing device disclosed in the Official Gazette of JP-A-2000-167366 and the devices utilizing ordinary absorption columns produce a concentration gradient in the parts performing an operation of absorbing ozone gas. The ozonated water producing devices which utilize ejectors or membranes of hollow fibers may be provided with stepped plates so as to produce an ozone concentration gradient in the parts producing ozonated water.

In the production of the ozonated water, the method which aims at establishing a gas-liquid contact as by mixing or blowing in a single tank manifests a poor efficiency in the absorption of ozone owing to the gas-liquid equilibrium and produces the ozonated water at a low concentration. Thus, the practice of using cylindrical modules in a multiplicity of stages as observed in a column device, a multistage column, or a membrane of hollow fibers and allowing the ozone gas and the absorbing water to come into counterflow contact constitutes one method of obtaining the ozonated water of a high concentration with high efficiency. In this case, the ozonated water in the absorption device is enabled to produce a concentration gradient from the inlet port through the outlet port for the absorbing water.

When the ozonated water is used as circulated, the ozonated water in the return flow has the concentration thereof lowered because it has required time for the circulation. When this ozonated water of the lowered concentration is returned as it is to the neighborhood of the outlet port of the place for absorption, the ozonated water to be produced undergoes dilution. When it is returned to the neighborhood of the inlet port for the absorbing water (fresh water), the ozonated water of the return flow induces dissipation of ozone. Thus, the insertion of the ozonated water of the return flow into the part producing the concentration gradient turns out to be an efficient reclamation of the ozonated water of the return flow.

By allowing the return line of the ozonated water to arrive at the part of the ozonated water production unit which is producing the concentration gradient, it is made possible to exalt the efficiency of the utilization of ozone and decrease the loss of ozone due to escape from absorption or dissipation. Preferably, the best effect is secured by causing the return part of the ozonated water in circulation to approximate the ozone concentration of the ozonated water circulating in the ozonated water production unit. By imparting the construction described above to the apparatus, it is made possible to ensure supply of the ozonated water of a stabilized concentration even when the ozonated water is used intermittently at the place of use.

The ozonated water concentration in the return flow is not always enabled to approximate the concentration corresponding to one and the same part of the concentration gradient at the place of absorbing the ozone owing to the fluctuation in the amount of the ozonated water to be used at the place of use or the fluctuation in the operation of the device. It is, therefore, permissible to perform the production under the best conditions by manually or automatically changing the position for returning the ozonated water.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

DETAILED DESCRIPTION OF PREFERRED EMBODIMENTS

The apparatus for carrying out the invention will now be described in detail below with reference to the drawings.

Figure 3:
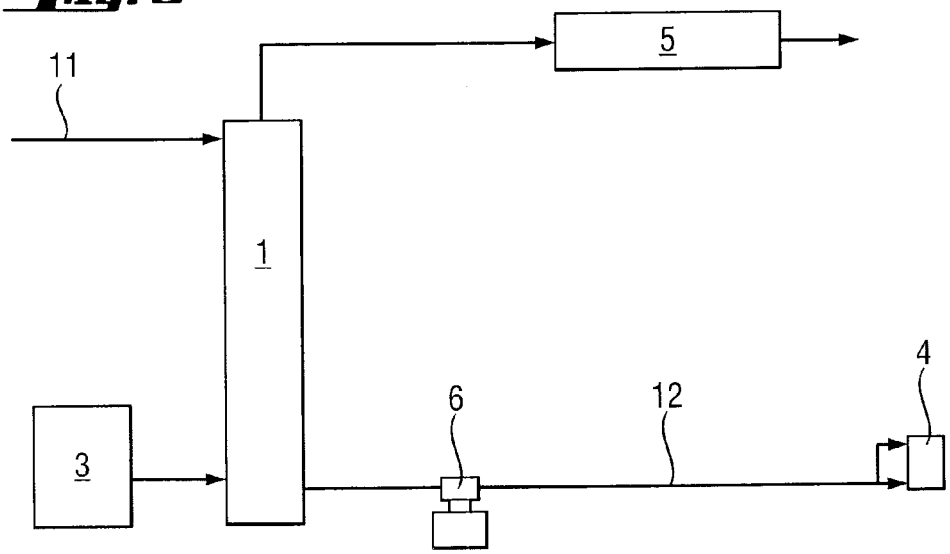
FIG. 3 illustrates one example of the conventional apparatus for the supply of ozonated water.
Figure 4:
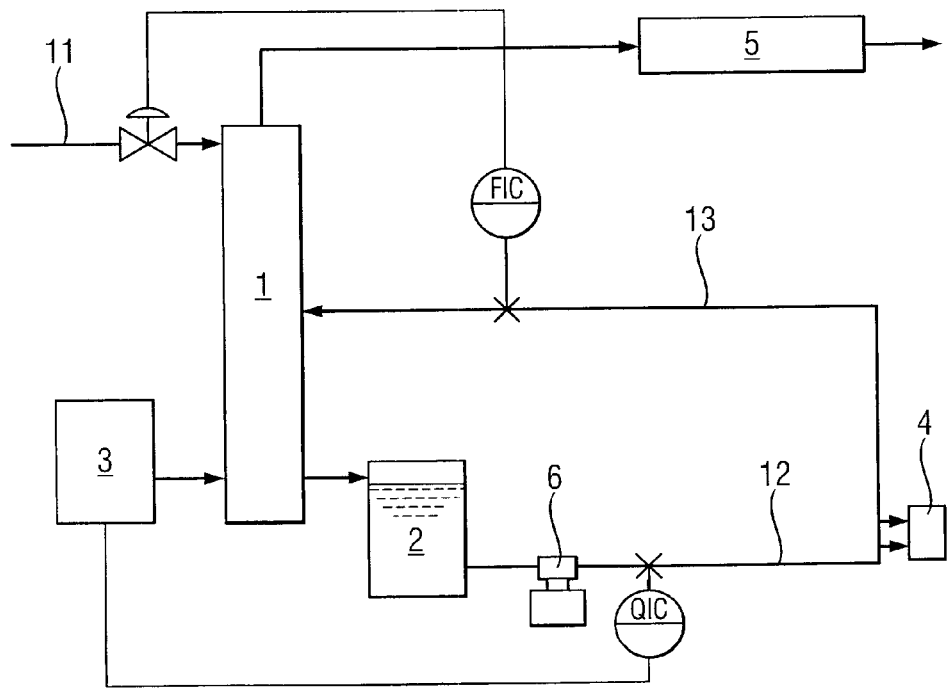
FIG. 4 illustrates one embodiment of the subject invention wherein a separate storage tank is utilized.

FIG. 3 illustrates one example of the conventional apparatus for supplying the ozonated water.

With reference to FIG. 3, at a place 4 for using the ozonated water, even when the ozonated water is used intermittently, the ozonated water is produced in a fixed amount at all times and discarded lest the concentration should fluctuate during the use of the ozonated water. The idea of monitoring the amount of the ozonated water to be used and adjusting the amount of the ozonated water to be produced in conformity to the amount of use seems to be practicable. This idea is not easily adopted for the apparatus which is required to maintain the concentration constant, however, because the ozone concentration at the place of using the ozonated water is fluctuated by the fluctuation of the retention time in the line owing to the change in the flow rate ascribable to the self-decomposition of ozone.

Figure 1:
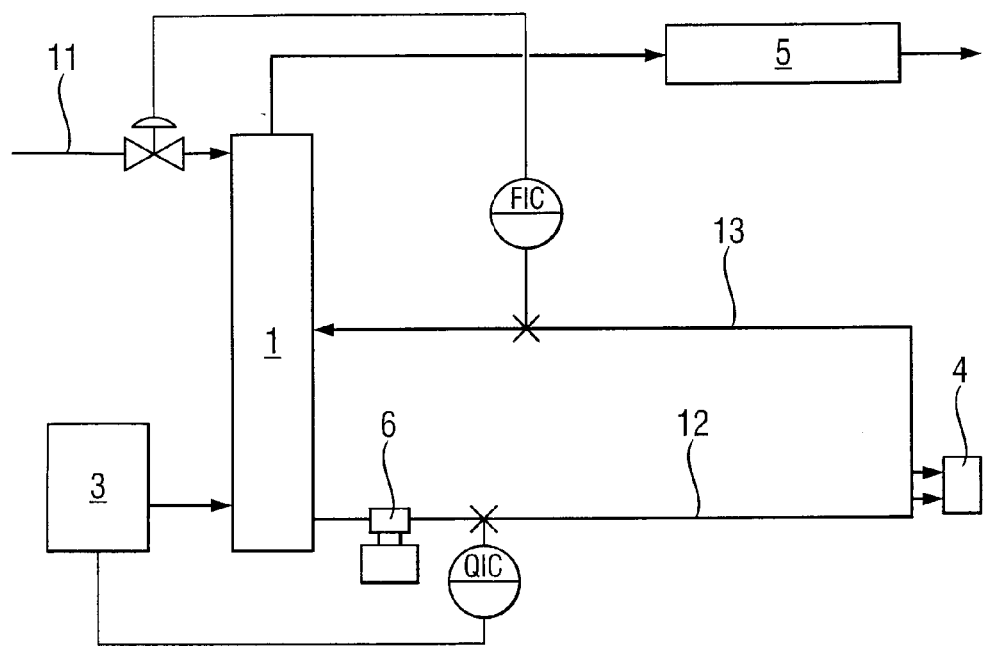
FIG. 1 illustrates one example of the apparatus for carrying out this invention based on a first embodiment of the invention.

FIG. 1 illustrates one example of the apparatus for carrying out this invention based on the first embodiment. With reference to FIG. 1, an apparatus 1 for the production of ozonated water is producing the ozonated water by causing ozone gas to be absorbed by feed water 11 and the produced ozonated water is circulated through a circulating line disposed between the apparatus 1 and a place 4 for using the ozonated water. Specifically, the ozonated water passes a pipe for feed ozonated water 12 and reaches the place 4 for using the ozonated water. Part of the ozonated water is used at the place and the remainder thereof is passed through a pipe for the return ozonated water 13 and returned to the apparatus 1 for the production of the ozonated water. Thus, the circulation forwards the ozonated water in an amount exceeding the maximum amount of use lest the amount of return should reach zero even when the maximum amount of use occurs at the place of use. In the case of the apparatus of FIG. 1, the return amount of the ozonated water is monitored (FIC) and the amount of the feed water 11 to the apparatus 1 for the ozonated water production is adjusted based on the result of the monitoring. Since the ozone concentration in the produced ozonated water is varied by the fluctuation of the return amount of the ozonated water and the amount of the feed water, the ozone concentration is measured (QIC) in the neighborhood of the outlet port of the apparatus 1 for the ozonated water production and the result of the measurement is fed back to the amount of the ozone gas being supplied. The feedback used in this case may be the feedback to the ozone gas generating unit. It may serve the purpose of adjusting the electric power of the ozone gas generating unit and consequently changing the ozone gas concentration.

The position for measuring the ozone concentration may be the output port of the apparatus 1 for the ozonated water production or the output port of the circulating pump 6, for example. It is only required to be in the neighborhood of the apparatus 1 for the ozonated water production and to be incapable of inducing a change in the concentration of the ozonated water.

The feedbacks of the ozonated water concentration and the amount of the ozonated water used are applied to the amounts of the feed water and the ozone gas to be supplied and to the ozone gas generating unit, with the result that the ozonated water of a fixed concentration will be supplied over a fixed retention time to the place of use. The amount of the ozonated water used is detected in the return line and the result of this detection is fed back to the amount of the fresh feed water to be supplied. Thus, even when the ozonated water is used at a plurality of places, these places do not need to be specified and the operation can be carried out so as to suit the amount used.

Figure 2:
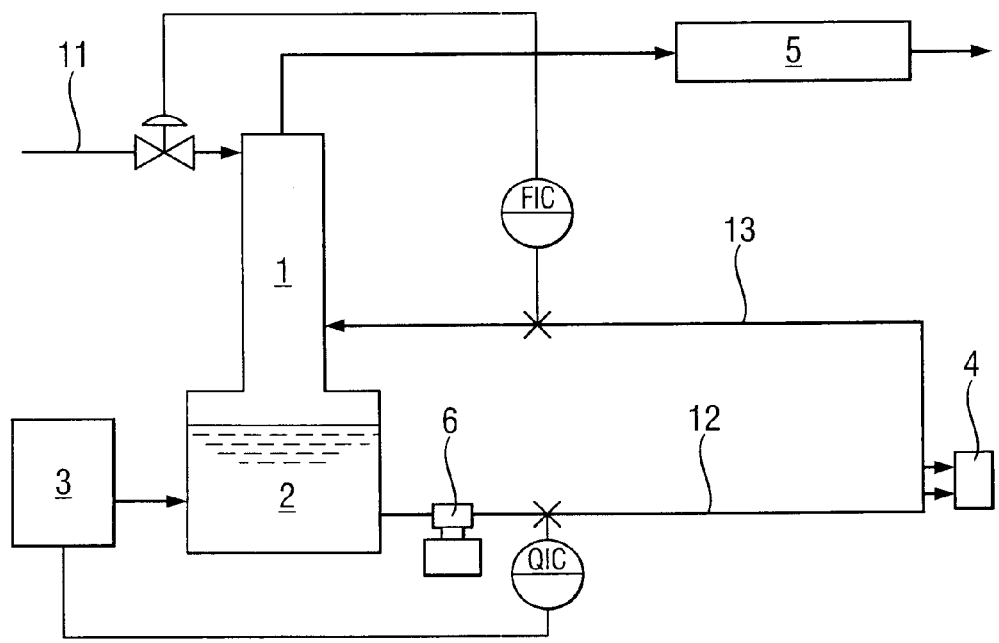
FIG. 2 illustrates one example of the apparatus for carrying out this invention based on a second embodiment of the invention.

FIG. 2 illustrates one example of the apparatus for carrying out this invention based on the second embodiment of the invention.

With reference to FIG. 2, the apparatus 1 for the ozonated water production is producing ozonated water by causing ozone gas to be absorbed in the feed water 11. The produced ozonated water is sent through an ozonated water storage tank 2 and a concentration detecting device QIC via feed ozonated water lines to the place 4 for using the ozonated water and then returned through the circulating line 13 to the apparatus 1 for the ozonated water production. In the storage tank 2, the ozonated water is retained therein when the amount of the ozonated water to be used is small and is discharged therefrom when the amount of use is large. Also in the apparatus illustrated in FIG. 2, the amount of the ozonated water to be circulated is set at a level such that the circulation is not stopped even when the amount of the ozonated water to be used reaches the maximum.

The ozonated water storage tank is intended to fulfill the function of relaxing the fluctuation of the load exerted to bear on the apparatus for the ozonated water production by the change in the amount of the ozonated water to be used. Though it is allowable to monitor the amount of the ozonated water to be used and feed back the result of this monitoring to the amount of the feed water to be supplied so as to preclude sudden change in the amount of the feed water, it is still preferable to set the average flow rate of the amount of the ozonated water to be used as a fixed amount of supply by way of giving an allowance to the storage tank.

The storage tank may be an independent unit relative to the apparatus for the ozonated water production. When the decomposition of ozone in the storage tank is taken into account, however, it is preferable to have the storage tank incorporated in the apparatus for the ozonated water production and enabled therein to maintain the concentration.

The inner volume of the storage tank is decided by taking into account the frequency of use and the amount of use at the place for using the ozonated water.

The return line for the circulated liquid may assume the same position as the fresh feed water. When the type of the apparatus for the ozonated water production conforms to the method disclosed in the Official Gazette of JP-A-2000-167366 or the method of production resorting to multistage absorption and, consequently, enables the ozonated water to assume a concentration which is intermediate between the fresh feed water and the liquid in the process of production, the approximation of the return flow of circulation to the ozone concentration turns out to be a proper method in terms of the ozone concentration of the ozonated water to be discarded and the efficiency of absorption and production.

Incidentally, in the present invention, the ozone concentration of the ozonated water to be supplied to the place of use is allowed to exceed slightly or substantially equal the concentration aimed at. When the concentration is required to be controlled more strictly, the concentration may be given fine adjustment at the place of use as occasion demands.

According to the present invention, the produced ozonated water can be used without being discharged even when the use of the ozonated water at the place of use is suspended temporarily. This invention allows the ozonated water of a fixed concentration to be produced and supplied at all times and ensures effective use of ozone.

COMPARATIVE EXAMPLE 1

By the use of a conventional apparatus for ozonated water illustrated in FIG. 3, ozonated water was continuously produced and the ozonated water was intermittently used at the place of use of ozonated water separated by about 100 m from the apparatus. This apparatus for the ozonated water production conformed to the construction disclosed in the Official Gazette of JP-A-2000-167366 and had five places of using the ozonated water. At each of these places, the ozonated water was used for a period of 5 minutes once per two hours in an amount of 2 L/min. Table 1 shows the amounts of the ozonated water used and the ozone concentrations found at these places. At the place of use separated by 100 m, the concentration was decreased in consequence of the self-decomposition of ozone. The water used for the production was ultra pure water popularly used in the industry of semiconductors.

TABLE 1

| | Flowrate or amount of storage | Ozonated water concentration [ppm] |
|---|---|---|
| Fresh water supplied to apparatus for ozonated water production | 10 L/min | 0 |
| Ozone gas supplied to apparatus for ozone water production | 3 NL/min | — |

TABLE 1-continued

|  | Flowrate or amount of storage | Ozonated water concentration [ppm] |
|---|---|---|
| Ozonated water storage tank | 0 L | — |
| Ozonated water at outlet port of apparatus for ozonated water production | 10 L/min | 55 |
| Outlet port of place of using ozonated water | 5 × 2 L/min | 53 |

At the place for using the ozonated water, the ozonated water was automatically diluted to 50 ppm by monitoring the ozone concentration for the purpose of stabilizing the ozone concentration. In this comparative experiment, the ozonated water was constantly produced at a rate of 10 L/min. The five places each used the ozonated water for a limited period of five minutes per two hours in an amount of 2 L/min. During the remainder of the time, the produced ozonated water was discarded. The amount of the discarded ozonated water, therefore, totaled 1150 L as compared with the total amount, 1200 L, of the ozonated water produced during the two hours.

EXAMPLE 1

By the use of an apparatus illustrated in FIG. 1, ozonated water was produced and the ozonated water was intermittently used at the place of use of ozonated water separated by about 100 m from the apparatus. This apparatus for the ozonated water production conformed to the construction disclosed in the Official Gazette of JP-A-2000-167366 and had five places of using the ozonated water. At each of these places, the ozonated water was used for a period of 5 minutes once per two hours in an amount of 2 L/min. From the apparatus for the ozonated water production, the ozonated water was supplied at a fixed flow rate to a circulating line by the use of a metering pump. The ozone concentration in the ozonated water was monitored at the outlet port of the metering pump and the amount of the ozone gas supplied to the apparatus for the ozonated water production was adjusted based on the result of the monitoring. Meanwhile, the total amount of the ozonated water used at the places of use was monitored in the return line of the ozonated water and the amount of the fresh feed water to be supplied to the apparatus for the ozonated water production was adjusted based on the result of the monitoring. The present example applied the feedback to the amount of the ozone gas to be supplied for the sake of adjusting the concentration of the ozonated water supplied from the apparatus for the ozonated water production. For the purpose of this adjustment, a method which adjusts the ozone gas concentration or a method which adjust the ozone gas concentration and the amount of the gas may be adopted instead. The water used in this example was ultra pure water.

Table 2 shows the amounts of ozonated water used and the ozone concentrations found at the positions of use. At the position of use separated by 100 m, the concentrations decreased on account of the self-decomposition of ozone.

TABLE 2

|  | Flow rate or amount of storage | Ozonated water concentration [ppm] |
|---|---|---|
| Fresh water supplied to apparatus for ozonated water production | max 10 L/min average 0.42 L/min | 0 |
| Ozone gas supplied to apparatus for ozone water production | max 3.0 NL/min average 0.34 NL/min | — |
| Ozonated water storage tank | 0 L | — |
| Ozonated water at outlet port of apparatus for ozonated water production | 12 L/min | 55 |
| Outlet port of place of using ozonated water | max 5 × 2 L/min | 53 |

At the place for using the ozonated water, the ozonated water was automatically diluted to 50 ppm by monitoring the ozone concentration for the purpose of stabilizing the ozone concentration. The amount of the ozonated water used was monitored by measuring the return amount and the ozonated water was produced based on the result of this monitoring. Since the circulated ozone was partially decomposed, it was necessary to continue the supply of the ozone gas while the ozonated water was not in use. During a period of two hours, 50 L of ozonated water was produced and the amount of ozone gas used for the production of the ozonated water was about 40 NL/2 hrs.

EXAMPLE 2

By the use of an apparatus illustrated in FIG. 2, ozonated water was produced and the ozonated water was intermittently used at the place of use of ozonated water separated by about 100 m from the apparatus. This apparatus for the ozonated water production conformed to the construction disclosed in the official gazette of JP-A-2000-167366 and had five places of using the ozonated water. At each of these places, the ozonated water was used for a period of 5 minutes once per two hours in an amount of 2 L/min. In this example, for the purpose of decreasing the size of the ozone generating unit, this unit was provided with an ozonated water storage tank so as to complete a system for allowing the production of the ozonated water to be continued and the produced ozonated water to be stored while the ozonated water was not used. From the ozonated water storage tank, the ozonated water was supplied at a fixed flow rate to the circulating line by the use of a metering pump. The ozone concentration in the ozonated water was monitored at the outlet port of the metering pump and the amount of the ozone gas supplied to the apparatus for the ozonated water production was adjusted based on the result of the monitoring. It is permissible to apply the feedback, similarly to Example 1, to the concentration of the ozone gas to be supplied or to the ozone gas concentration and the flow rate of the gas and adjust the ozonated water concentration. The amount of the ozonated water to be stored in the storage tank is decided by taking into account the amount of the ozonated water to be used, the time of use, and the intervals between the periods of use. In this example, the apparatus for the ozonated water production was operated by fixing the amount of the fresh feed water to be supplied to the apparatus. It is permissible, similarly to Example 1, to monitor the flow rate of the ozonated water to the return line and adjust the amount of the fresh feed water to be supplied. The water used in this example was ultra pure water.

Table 3 shows the amounts of the ozonated water used and the ozone concentrations found at the places of use.

TABLE 3

|  | Flow rate or amount of storage | Ozonated water concentration [ppm] |
|---|---|---|
| Fresh water supplied to apparatus for ozonated water production | 0.42 L/min | 0 |
| Ozone gas supplied to apparatus for ozone water production | max 1.1 NL/min average 0.72 NL/min | — |
| Ozonated water storage tank | 60 L | — |
| Ozonated water at outlet port of apparatus for ozonated water production | 12 L/min | 55 |
| Outlet port of place of using ozonated water | max 5 × 2 L/min | 53 |

At each of the places of using the ozonated water, the ozone concentration was monitored and the ozonated water was automatically diluted to 50 ppm for the purpose of stabilizing the ozone concentration. Owing to the installation of the storage tank for the ozonated water, the decomposition of ozone was so large that the ozone gas was required to be supplied in a larger amount than in Example 1. Since the amount of the ozonated water produced and the amount of the ozone gas supplied were both fixed, however, the fluctuation of the concentration observed more or less at the time of starting the use in Example 1 was repressed and the concentration was stabilized. In the period of two hours, the ozonated water was produced in an amount of 50 L. The amount of the ozone gas used for the production of the ozonated water was about 86 NL/2 hrs.

In Examples 1 and 2, the amounts of the feed water and the amounts of the ozone gas needed were found to differ widely from those of Comparative Example 1. In Example 2, though the amount of the ozone gas needed was large as compared with Example 1, the stability of the apparatus was exalted and the fluctuation of the concentration at the time of starting the use was decreased. The choice between Example 1 and Example 2 is preferred to be decided by taking into account the range of permissible fluctuation of concentration and the cost of production of the ozone gas.

EXPLANATION OF REFERENCE NUMERALS

1 Apparatus for ozonated water production
2 Ozonated water storage tank
3 Ozonated water generating unit
4 Place of use of ozonated water
5 Apparatus for decomposition of ozone gas
6 Pump
11 Feed water
12 Feed ozonated water
13 Return ozonated water
FIC Flow detecting unit
QIC Concentration detecting unit Accordingly, while only a few embodiments of the present invention have been shown and described, it is obvious that many changes and modifications may be made thereunto without departing from the spirit and scope of the invention.

What is claimed is:

1. A method for the supply of a constant-concentration ozonated water, comprising
employing a unit for producing ozonated water by contact between an ozone-containing gas and water and a system for using the ozonated water produced by the unit at a place separated therefrom, said unit having an inlet for non-ozonated feed water, an ozonated water inlet, and an ozonated water outlet;
interposing an ozonated water circulating line between the ozonated water inlet and the ozonated water outlet, the circulating line extending extending to a neighborhood of the place for using the ozonated water;
causing an interior of the circulating line to circulate the ozonated water so that a flow rate may be constantly fixed at the ozonated water outlet of the ozonated water producing unit;
monitoring an ozone concentration of the ozonated water in the neighborhood of the ozonated water outlet;
adjusting an amount of the ozone containing gas supplied to the ozonated water producing unit and/or a concentration of the ozone containing gas based on results of the monitoring;
further monitoring an amount of the ozonated water used at the place for using the ozonated water; and
controlling an amount of the ozonated water to be produced based on the results of monitoring of the amount of ozonated water used.

2. A method according to claim 1, wherein the amount of the ozonated water to be produced is controlled by monitoring in the ozonated water circulating line the amount of the ozonated water used at the place for using the ozonated water.

3. A method according to claim 1, comprising producing ozonated water in the ozonated water producing unit by dissolving ozone gas in water, creating an ozone concentration gradient in the ozonated water producing unit, said gradient located between the inlet of non-ozonated feed water and the ozonated water outlets, and supplying the ozonated water returned through the ozonated water circulating line to the ozonated water inlet at a location in the unit where the concentration gradient exists, this location positioned at or after the inlet of non-ozonated feed water.

4. A method according to claim 3, wherein the ozonated water producing unit utilizes an absorption column.

5. The method of claim 3 wherein the ozonated water returned to the ozonated water producing unit is supplied to a location within the concentration gradient wherein the concentrations of ozone in the ozonated water being returned and water being ozonated are approximately the same.

6. A method according to claim 1, comprising treating semiconductors with said constant-concentration ozonated water.

7. A method according to claim 1, wherein the ozonated water produced and supplied by the ozonated water producing unit has a concentration of not less than 10 ppm.

8. A method for the supply of a constant-concentration ozonated water comprising
employing a unit for produced ozonated water by contact between an ozone-containing gas and water and a system for using the ozonated water produced by the unit at a place separated therefrom, said unit having an inlet for non-ozonated feed water, an ozonated water inlet, and an ozonated water outlet;

disposing a storage tank in the ozonated water producing unit or between the ozonated water producing unit and the place for using the ozonated water;

interposing an ozonated water circulating line between the ozonated water inlet and the ozonated water outlet, said line extending to a neighborhood of the place for using the ozonated water;

causing an interior of the circulating line to circulate the ozonated water so that a flow rate may be constantly fixed at said ozonated water outlet of the ozonated water producing unit;

monitoring an ozone concentration of the ozonated water in a neighborhood of the ozonated water outlet;

adjusting an amount of the ozone containing gas supplied to the ozonated water producing unit and/or a concentration of the ozone containing gas based on results of the monitoring;

whereby the storage tank reduces fluctuations of the load placed on the ozonated water producing unit.

9. A method according to claim 8, wherein the amount of the ozonated water to be produced is controlled by monitoring in the ozonated water circulating line the amount of the ozonated water used at the place for using the ozonated water.

10. A method according to claim 8, comprising producing ozonated water in the ozonated water producing unit by dissolving ozone gas in water, creating an ozone concentration gradient in the ozonated water producing unit, said gradient located between the inlet of non-ozonated feed water and the ozonated water outlets, and supplying the ozonated water returned through the ozonated water circulating line to the ozonated water inlet at a location in the unit where the concentration gradient exists, this location positioned at or after the inlet of non-ozonated feed water.

11. A method according to claim 10, wherein the ozonated water producing unit utilizes an absorption column.

12. The method of claim 10 wherein the ozonated water returned to the ozonated water producing unit is supplied to a location within the concentration gradient wherein the concentrations of ozone in the ozonated water being returned and water being ozonated are approximately the same.

13. A method according to claim 8, comprising treating semiconductors with said constant-concentration ozonated water.

14. A method according to claim 8, wherein the ozonated water produced and supplied by the producing unit has a concentration of not less than 10 ppm/ozonated water.

* * * * *

UNITED STATES PATENT AND TRADEMARK OFFICE
CERTIFICATE OF CORRECTION

PATENT NO. : 7,276,168 B2 Page 1 of 1
APPLICATION NO. : 10/975510
DATED : October 2, 2007
INVENTOR(S) : Teruo Haibara et al.

It is certified that error appears in the above-identified patent and that said Letters Patent is hereby corrected as shown below:

Column 14, Line 12, Claim 1:

Delete "extending" (first instance)

Signed and Sealed this

Twenty-ninth Day of April, 2008

JON W. DUDAS
*Director of the United States Patent and Trademark Office*